US007055721B2

(12) United States Patent
Lee

(10) Patent No.: US 7,055,721 B2
(45) Date of Patent: Jun. 6, 2006

(54) FINGER-OPERATED SPRAY PUMP EJACULATING FLUID IN FIXED QUANTITY

(75) Inventor: Chung Kee Lee, Seoul (KR)

(73) Assignee: Chong Woo Co., Ltd., Inchon (KR)

(*) Notice: Subject to any disclaimer, the term of this patent is extended or adjusted under 35 U.S.C. 154(b) by 0 days.

(21) Appl. No.: 10/875,866

(22) Filed: Jun. 23, 2004

(65) Prior Publication Data

US 2005/0023299 A1 Feb. 3, 2005

Related U.S. Application Data

(63) Continuation-in-part of application No. 10/275,152, filed as application No. PCT/KR01/00910 on May 30, 2001, now abandoned.

(30) Foreign Application Priority Data

Mar. 23, 2001 (KR) .......................... 2001-0015217

(51) Int. Cl.
*G01F 11/06* (2006.01)

(52) U.S. Cl. .................................................. 222/321.9

(58) Field of Classification Search ............ 222/321.9, 222/385

See application file for complete search history.

(56) References Cited

U.S. PATENT DOCUMENTS

| | | | | |
|---|---|---|---|---|
| 4,065,038 | A | 12/1977 | Magers et al. | 222/321 |
| 4,173,297 | A | 11/1979 | Pettersen | 222/321 |
| 4,389,003 | A | 6/1983 | Meshberg | 222/321 |
| 4,944,432 | A | 7/1990 | Jouillat | 222/321 |
| 5,096,097 | A | 3/1992 | Lina | 222/385 |
| 5,234,135 | A | 8/1993 | LaFosse et al. | 222/321 |
| 5,277,558 | A | 1/1994 | Long | 417/481 |
| 5,277,559 | A | 1/1994 | Schultz | 417/543 |
| 5,482,188 | A | 1/1996 | Lina | 222/321.2 |
| 5,803,318 | A | 9/1998 | Lina | 222/321.2 |
| 6,209,759 | B1 | 4/2001 | Hermouet et al. | 222/321.2 |
| 6,340,102 | B1 | 1/2002 | Su | 222/321.2 |
| 6,371,337 | B1 | 4/2002 | Garcia et al. | 222/385 |
| 2003/0155377 | A1 | 8/2003 | Lee | 222/321.7 |

FOREIGN PATENT DOCUMENTS

| | | |
|---|---|---|
| EP | 0 757 004 A1 | 2/1997 |
| KR | 20-0204024 | 11/2000 |
| KR | 10-2002-0067623 | 11/2002 |
| WO | 02/33258 A1 | 4/2002 |

*Primary Examiner*—Philippe Derakshani
(74) *Attorney, Agent, or Firm*—Ladas & Parry LLP

(57) ABSTRACT

The present invention relates to a finger-operated spray pump ejaculating fluid in fixed quantity at one-time pumping, and more particularly a spray pump in which a poppet valve and a sliding seal are made as one unit and the structure of the housing is modified for lower defect rate and improved convenience.

12 Claims, 9 Drawing Sheets

Prior Art

Prior Art

FINGER-OPERATED SPRAY PUMP EJACULATING FLUID IN FIXED QUANTITY

CROSS-REFERENCE TO RELATED APPLICATIONS

This application is a continuation-in-part and claims the benefit of U.S. Ser. No. 10/275,152, filed Feb. 25, 2003 now abandoned, which is the U.S. national stage of International Application No. PCT/KR01/00910, filed May 30, 2001, which claims the benefit of Korean National Application No. 2001/0015217, filed on Mar. 23, 2001. The entire contents of U.S. Ser. No. 10/275,152, International Application No. PCT/KR01/00910, and Korean National Application No. 2001/0015217 are hereby incorporated reference herein.

BACKGROUND OF THE INVENTION

1. Field of the Invention

The present invention is directed to a finger-operated spray pump ejaculating liquid contents in a fixed quantity at one-time pumping, and more particularly a spray pump in which a poppet valve and a sliding seal are made as one unit and the structure of the housing is modified for lower defect rate and improved convenience.

2. Description of Related Art

Finger-operated spray pumps have been used to the upper caps of the liquid-containing vessels such as metal cans, glass bottles and plastic bottles, i.e., vessels containing liquids like perfumes, hair-spraying agent, deodorizing agents, neck-spraying agent and the like. Using the spray pumps relieves the troublesome operation of opening and closing the cap of the vessels and difficulty spraying in a fixed quantity. Moreover, liquid contents contained in the vessels are not almost dried and deteriorated by external materials because the contents are continuously kept under the closed state.

The representative example of these finger-operated fixed-quantity spray pump is shown in U.S. Pat. No. 5,277,559. The structure and operation of the spray pump in the above patent will be described with reference to FIGS. 1 and 2.

Referring to FIG. 1, the conventional finger-operated fixed-quantity spray pump comprises an actuator (100), a pump member (200) and a sealing cap (300) in a whole view. A piston (220) with an influx passage therein is engaged to the lower portion of the actuator (100). The actuator (100) has an ejecting nozzle (not shown) led to the influx passage of the piston (220).

The pump member (200) includes a housing (210) forming the external appearance, a piston (220) being engaged to the actuator (100) and moving upward/downward in the housing (210), a poppet valve (230) being installed in the piston (220), a sliding seal (240) being close-contacted to the inner surface of the housing (210) and being installed in the lower portion of the poppet valve (230), a spring (250) being installed between sliding seal (240) and the lower portion of the housing (210).

The sliding seal (240) is disposed on the lower portion of the housing (210) and poppet valve (230) at their axis direction, and assembled to move together with poppet valve (230).

A tube (not shown) is extended to the inner bottom of a vessel containing liquid contents and engaged to the lower end of the pump (200).

The spring (250) is disposed in the pump member (200), and its lower end is mounted in the lower space of the housing (210) and its upper end is engaged to a downward extension pin of the poppet valve (230).

The sealing cap (300) is combined to the corresponding portions of the housing (210) and piston (220), with a liner (310) being installed to prevent the leakage of the liquid contents.

The operation way of the finger-operated fixed-quantity spray pump having such structure will be described with reference to FIGS. 1 and 2.

When the actuator (100) is pressurized, the pressure is transferred to the poppet valve (230) and sliding seal (240) via the piston (220). At this time, a downward slope (231) at the lower portion of the poppet valve (230) becomes contacted to an inner lip (241) of the sliding seal (240), and an outer downward slope (242) of the sliding seal (240) becomes contacted to an upward slope (213) of a housing bead (212). As the poppet valve (230) goes down continuously, the inner lip (241) of the sliding seal (240) slides on an outer surface (2310) beyond the downward slope (230) of the poppet valve (230). Since the outer surface (2310) of the poppet valve (230) and the inner lip (241) of the sliding seal (240) are kept at the closed-contact state, an upper space (A) of the housing (210) is closed against a lower space (B). Therefore, the continuous going-down pressurizes the liquid contents being in upper space (A). When the pressure of the liquid contents is sufficient to overcome the spring (250) force, the closed-contact portion of the piston (220) and poppet valve (230) becomes opened, and the liquid contents goes up through the opened portion.

Upon release of any actuating force on the actuator (100), the piston (220) and poppet valve (230) go up together with the sliding seal (240). At this time, the opened space between the piston (220) and poppet valve (230) becomes closed again by the spring (250) force, the closed-contact between the outer downward slope (242) of the sliding seal (240) and the upward slope (213) of the housing bead (212) is disengaged, thereby allowing the upper space (A) and lower space (B) of the housing (210) to be connected through an influx passage (243) to make the flow of the liquid contents possible. The sliding seal (240) goes up only until the outer upper slop (244) of the sliding seal (240) becomes contacted to the downward slope (214) of the housing bead (212). The outer surface (2310) of the poppet valve (230) goes up continuously, with keeping the closed-contact state to the inner bead (214) of the sliding seal (240), even after the contact of the above two units (244, 214), and finally the closed-contact is disengaged upon arrival at the downward slope (2310). Accordingly, the liquid contents in the housing lower space (B) flow into the housing upper space (A) so as to recover the pressure.

As described above, in the figure-operated fixed-quantity spray pump of such structure and operation, the poppet valve (230) and sliding seal (240), and the inner bead (212) conducting the opening/closing procedure by its mutuality with the above two units (230, 240) are very important. However, in an injection molding out of plastic, it is difficult to make the inner bead (212) in the identical form as designed because it is deeply located on the inner surface of the housing (210), particularly, in the case of very small size products like the figure-operated fixed-quantity spray pump. In other words, even the small error of the molded product may make the operation of the spray pump impossible. For example, if the protruding high of the inner bead (212) is a little lower than that in the design, the outer downward slope (241) of the sliding seal (240) cannot keep the closed-contact state to the upper slope (213) of the inner bead (212) and resultantly goes beyond the inner bead (212), which make the pumping impossible as described above. Furthermore, it is very difficult to check such defect of the inner bead (212).

Meanwhile, the ejection amount of the spray pump at one-time pumping depends upon the volume of a precompression part (corresponding to "A"), and in order to increase the ejection amount of one-time pumping, the volume of A should be increased, which requires extending the length or diameter of the housing.

However, the demand on the small-size pump is actually very high for the elegance of the appearance. The pump structure of the above U.S. patent has the inevitably small volume of the precompression part (A) because many units are necessary for operation.

Moreover, the sliding seal (240) is mainly made out of polyethylene resin for the flexibility of the unit; however, the polyethylene resin has a low dimensional-stability at the higher temperature of the molding procedure due to its low melting point.

Therefore, the structure of the spray pump capable of solving said problems is strongly required.

BRIEF SUMMARY OF THE INVENTION

An embodiment of the present invention provides a finger-operated fixed-quantity spray pump of being easily fabricated and having a remarkably low defect rate by modifying the configuration of a housing and poppet valve.

A further embodiment of the present invention provides an overall structure being simplified by not comprising a sliding seal as an independent unit, whereby making the fabrication process easier and diminishing the defect rate and resultantly reducing the number of fabrication steps to lessen the manufacturing cost.

Another embodiment of the present invention provides the pump structure having the large volume of the precompression part capable of increasing the ejection amount of one-time pumping by reducing the number of the units.

Another embodiment of the present invention provides the pump structure capable of controlling the ejection amount of one-time pumping.

One aspect of the invention is a finger-operated fixed-quantity spray pump comprising:

an actuator fixed on the upper portion of the pump for ejecting liquid contents;

a pump member for sucking the liquid contents from a vessel and ejecting the liquid contents with the actuator; and a sealing cap for fixing the pump member to the vessel and sealing the interior of the pump member from the external; wherein the pump member comprising:

a housing forming the external appearance of the pump member;

a piston being engaged to lower portion of the actuator and moving up and down along the inner surface of the housing and having an influx passage;

a poppet valve moving up and down and having a rod for opening and closing the influx passage of the piston at its upper portion, wherein the poppet valve being connected to a spring at its lower portion, and the spring being mounted in the lower inner portion of the housing, the poppet valve having a lateral extension part, a lower extension part being inserted in an inner tube of the housing lower portion upon moving the poppet valve down and the poppet valve being engaged with a part of the spring at its upper portion grooves being formed on the lower extension part; and the housing having an inner tube being located inside the spring and extending upward from an inlet.

Another aspect of the invention is a finger-operated fixed-quantity spray pump comprising:

an actuator fixed on the upper portion of the pump for ejecting liquid contents;

a pump member for sucking the liquid contents from a vessel and ejecting the liquid contents with the actuator; and a sealing cap for fixing the pump member to the vessel and sealing the interior of the pump member from the external; wherein the pump member comprising:

a housing forming the external appearance of the pump member;

a piston being engaged to lower portion of the actuator and moving up and down along the inner surface of the housing and having an influx passage;

a poppet valve moving up and down and having a rod for opening and closing the influx passage of the piston at its upper portion, wherein the poppet valve being connected to a first spring at its lower portion, and the first spring being mounted in the lower inner portion of the housing, and the poppet valve being connected to a second spring at its upper portion, and the second spring being mounted in the upper portion of the housing between the poppet valve and the piston, the poppet valve having a lateral extension part, a lower extension part being inserted in an inner tube of the housing lower portion upon moving the poppet valve down and the poppet valve being engaged with a part of the spring at its upper portion grooves being formed on the lower extension part; and the housing having an inner tube being located inside the spring and extending upward from an inlet.

As described above, the finger-operated fixed-quantity spray pump according to the present invention is fabricated with the smaller number of units and the simpler configuration than those of the conventional spray pump. Moreover, the spray pump according to the present invention does not have the problem in view of the molding process, compared to the conventional spray pump in which it is difficult to form the inner bead, whereby its defect rate is considerably low. Additionally, since it is possible in the present invention to easily control the ejection amount of one time pump just by adjusting the dimension of the part of units without the overall change of the structure.

Figure 1:
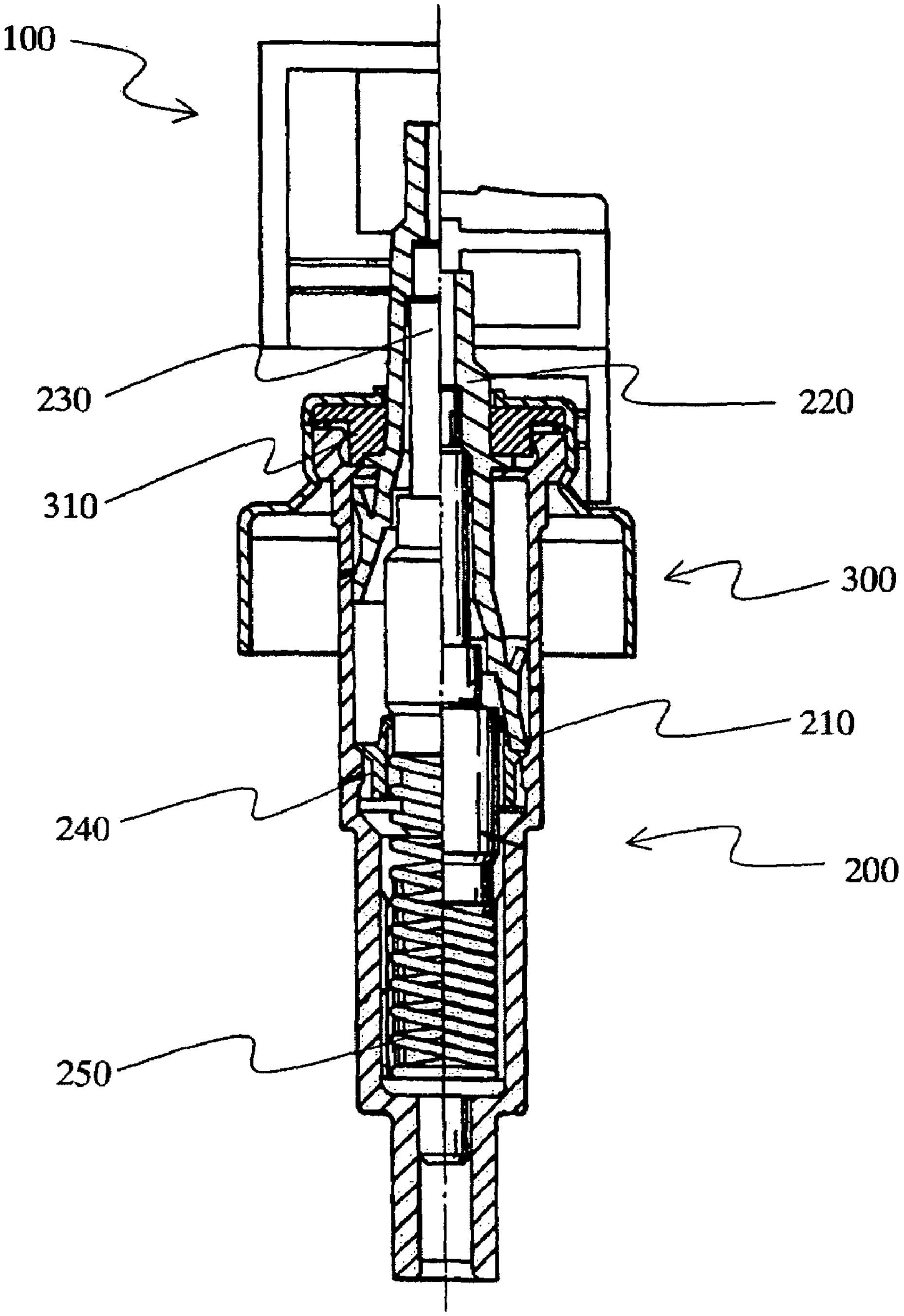
FIG. 1 (prior art) is a vertical cross-sectional view of the conventional finger-operated fixed-quantity spray pump at the pressurized state.
Figure 2:
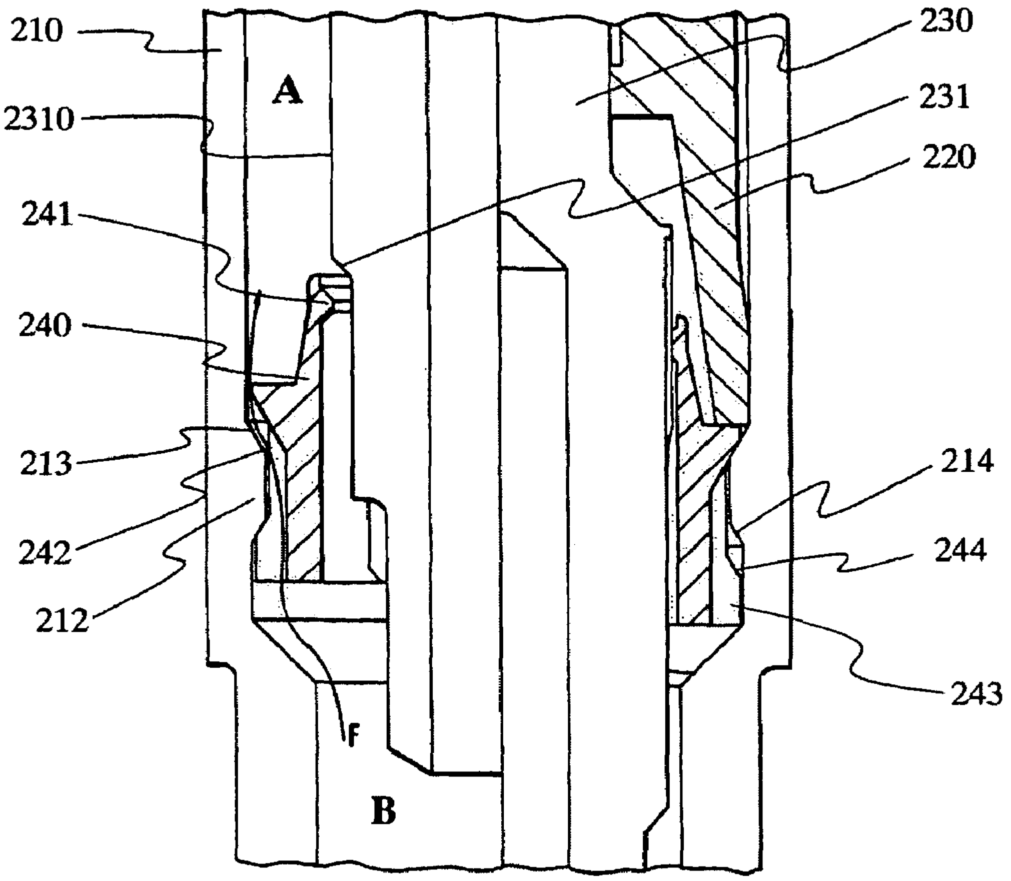
FIG. 2 (prior art) is a vertical cross-sectional view of the spray pump of FIG. 1 at the pressure-released state.

| Designation of the Reference Numbers | |
|---|---|
| 100 actuator | 200 pump member |
| 210 housing | 220 piston |
| 230 poppet valve | 240 sliding seal |
| 250 first spring | 300 sealing cap |
| 400 tube | 252 second spring |

DETAILED DESCRIPTION OF THE INVENTION

The finger-operated fixed-quantity spray pump of the present invention sucks the liquid contents into the pump member and then sends them to the actuator by the closed-contact/separation of the lower extension part of the poppet valve and the inner tube of the housing at pumping; therefore, an independent sliding seal is not necessary. More specifically, upon pressurization of the actuator, the lower extension part of the poppet valve is inserted in the inner tube of the housing at the closed-contact state, thereby allowing the internal space of the housing to be closed. To the contrary, upon release of the pressure, the liquid contents in the vessel enter the housing through the gap formed between the grooves of the lower extension part and the inner tube of the housing.

Accordingly, the outer diameter of the lower extension part of the poppet valve should be almost identical to the inner diameter of the inner tube of the housing for securing the closed-contact state, and the grooves of the lower extension part should be carved to the extent capable of being separated from the inner diameter of the inner tube.

The length of the grooves may depend upon the ejection amount of the pumping and is generally in the range of approximately 0.5 to 1.0 mm. If the length of the grooves is relatively small, the ejection amount becomes large. To the contrary, if the length of the grooves is relatively large, the ejection amount becomes small. That is because, in the case of the large-length grooves, the amount of the liquid contents to be leaked toward the inner tube upon the pressing is diminished, thereby allowing the ejection amount to be diminished. Therefore, since the ejection amount can be controlled by adjusting the length of the grooves, it is possible to control the ejection amount without transforming other units or changing the overall size of the pump. Furthermore, since the spray pump can be operated without the sliding seal used in the prior arts, the volume of the compression part becomes large for storing and pressurizing the contents.

The shape of the housing inner tube may be a simple cylindrical structure or in any case a complex cylindrical structure wherein protrusions corresponding to the grooves of the poppet valve are formed at the upper inner portion of the inner tube. At the latter, for securing the smooth operation, there should also be an influx gab separated between the grooves of the lower extension part and the protrusions of the inner tube, as described above. More preferably, the grooves are formed along the outer surface of the lower extension part and the corresponding protrusions are formed along the inner surface of the inner tube at the same manner.

These configurations may be diversely transformed under the above basic structure. In an exemplary configuration, a plurality of the grooves are formed along the inner surface of the lower extension of the poppet valve, and an aperture communicating with the internal space of the housing is perforated at the upper portion of the popper valve, and a plurality of the protrusions corresponding to the grooves are formed on the upper outer surface of the housing inner tube. The contrary configurations are also available in which the grooves are formed the upper outer or inner surface of the housing inner tube, and the corresponding protrusions are formed the inner or outer surface of the lower extension part of the poppet valve.

As described above, the lateral extension part is downward extended as a certain length. Accordingly, the overall cross-sectional shape shows that a "⌉" shape (for the right lateral part) resulted from the combination of a horizontal part and a vertical part faces the corresponding opposite shape. The whole surface of the horizontal part does not contact to an inner surface of the housing not to obstruct the flow of the liquid contents. Preferably, one or more inducing protrusions are attached to the part or whole of an outer surface of the lateral part. That is, the space between the inducing protrusions enables the passage of the contents and makes the poppet valve move stabile under the closed-contact state to the inner surface of the housing. In particular, the existence of the inducing protrusions helps the lower extension part of the poppet valve to move upward/downward along the inner tube of the housing without shaking. When the poppet valve goes down entirely, a lower end of the vertical part arrives at a horizontal surface of the housing.

Meanwhile, the distance of the pumping depends upon the overall length of the housing and the length of the vertical part of the poppet valve. As described above, since the pump structure of the present invention has a larger space of the precompression part, in which the pressurization of the contents occurs, than that of the conventional pump, the large change of the volume is possible despite of its small diameter. In other words, since the change of the diameter causes the change of the volume at a subduplicate ratio in the case of the same length, it is possible to change the ejection amount only by the small change of the dimension without the essential change of the structure. Accordingly, the figure-operated fixed-quantity spray pump of the present invention can be used for a variety of the spray pumps having the ejection amount in the range of 50 mcl (1 mcl=1/1000 cc) to 200 mcl.

Furthermore, the units except a ball and spring can be made of the polypropylene resin having a high melting point, whereby accomplishing the dimensional-stability under the high temperature and humidity condition.

As shown below, the description refers to the drawing in order to describe the present invention more in detail, thereby, the scope of the invention is however not to be interpreted as a limitation of the invention.

Figure 3:
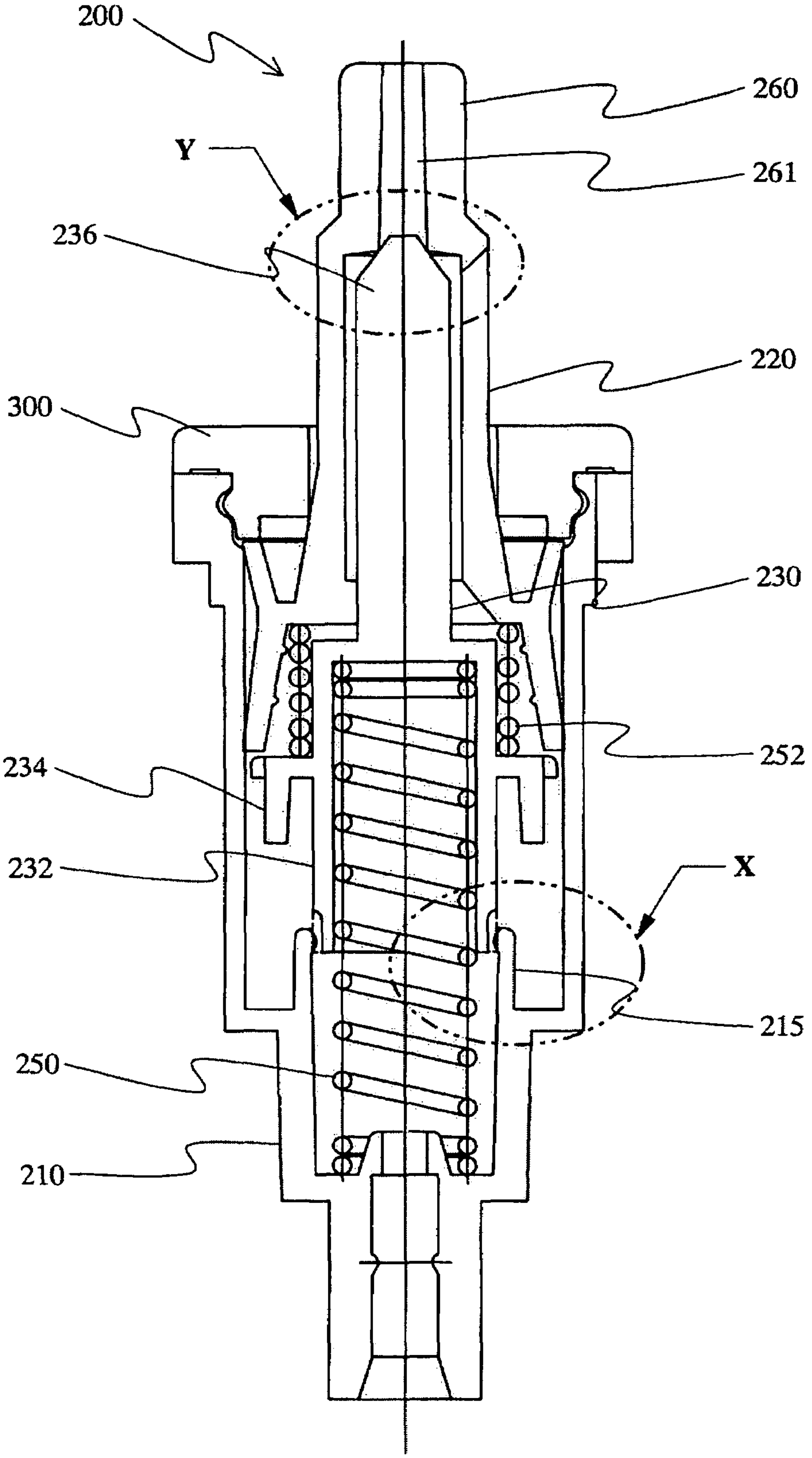
FIG. 3 is a vertical cross-sectional view of the finger-operated fixed-quantity spray pump according to the second embodiment of the present invention at the pressurized state.
Figure 4:
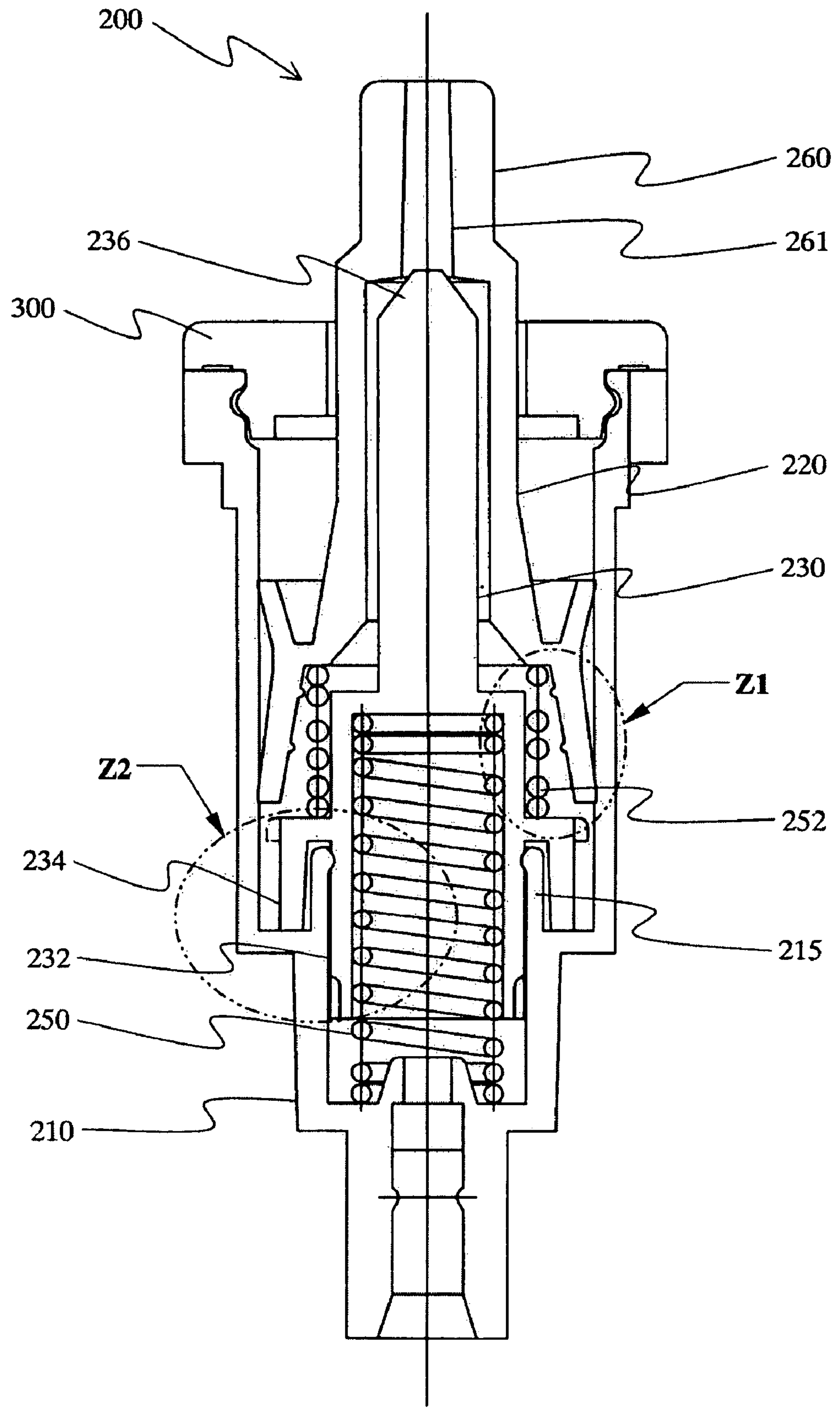
FIG. 4 is a vertical cross-sectional view of the spray pump of FIG. 3 at the pressure-released state.

FIGS. 3 and 4 show the finger-operated fixed-quantity spray pump according to the second embodiment the present invention at the state of going-up piston and going-down piston each other. Referring to these figures, the spray pump of the present invention comprises an actuator (not shown), a pump member (200), a sealing cap (300), etc., and an upper inserting part (260) of the pump member (200) is engaged to the lower portion of the actuator, and a tube (not shown) is engaged into the lower end of a housing (210).

The pump member (200) includes the housing (210), a piston (220), a poppet valve (230) and a first spring (250) and a second spring (252) as main constitutional elements.

Liquid contents contained in a vessel (not shown) flow into the pump member (200) and then go up to the actuator via an influx passage (261) of the piston (220).

The pump member (200) according to the first embodiment includes the housing (210), a piston (220), a poppet valve (230) and the first spring (250) as main constitutional elements. Liquid contents contained in a vessel (not shown) flow into the pump member (200) and then go up to the actuator via an influx passage (261) of the piston (220).

Figure 5:
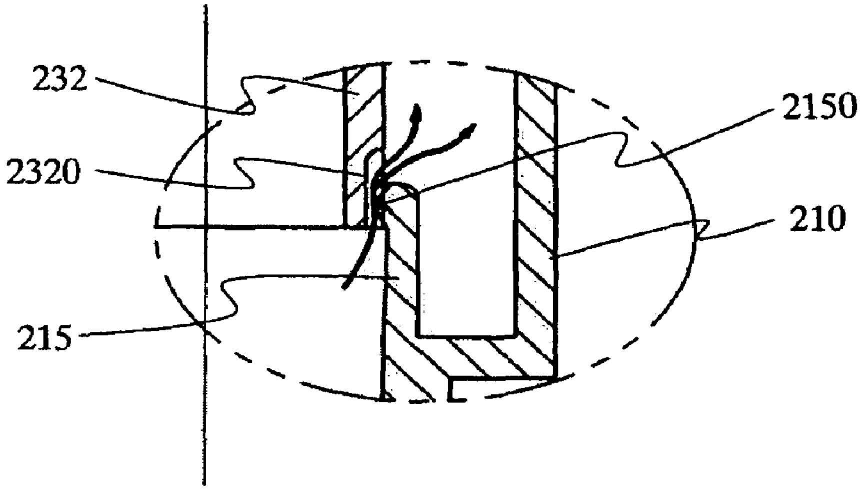
FIG. 5 is a magnified view of "X" region in FIG. 3.

FIG. 5 shows the region ("X") between a lower end of a lower extension part (232) of the poppet valve (230) and an inner tube (215) of the housing (210) at the spray pump state in FIG. 3. Grooves (2320) are formed on the outer surface of the lower extension (232), and protrusions (2150) corresponding to the grooves (2320) are formed the upper outer surface of the inner tube (215). The grooves (2320) and protrusions (2150) are somewhat separated from each other and the liquid contents flow into the pump member (200) through the separated gap.

Figure 6:
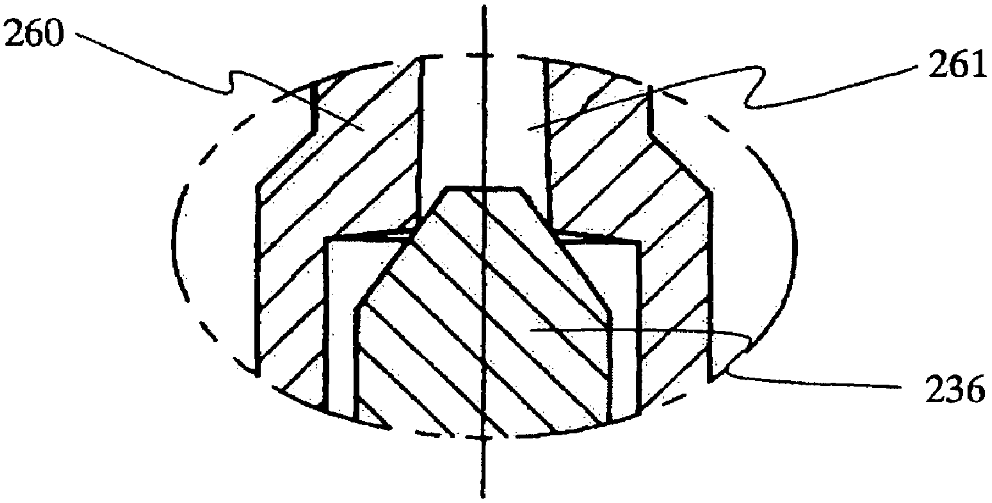
FIG. 6 is a magnified view of "Y" region in FIG. 3.

FIG. 6 shows the region ("Y") in which the influx passage (261) of an upper inserting part (260) of the piston (220) is closed by a rod (236) of the poppet valve (230) at the spray pump state in FIG. 3. The region (Y) is opened only when the internal pressure is pressurized by the going-down of the piston (220) and poppet valve (230) and it comes to the pretty extent. As the pressurized contents leak out to the influx passage (261) by opening of the region (Y) and thus the internal pressure of the housing (210) decreases, the region (Y) becomes closed again by the spring (250) force even before the piston (220) and poppet valve (230) arrive at the lowest point.

Figure 7A:
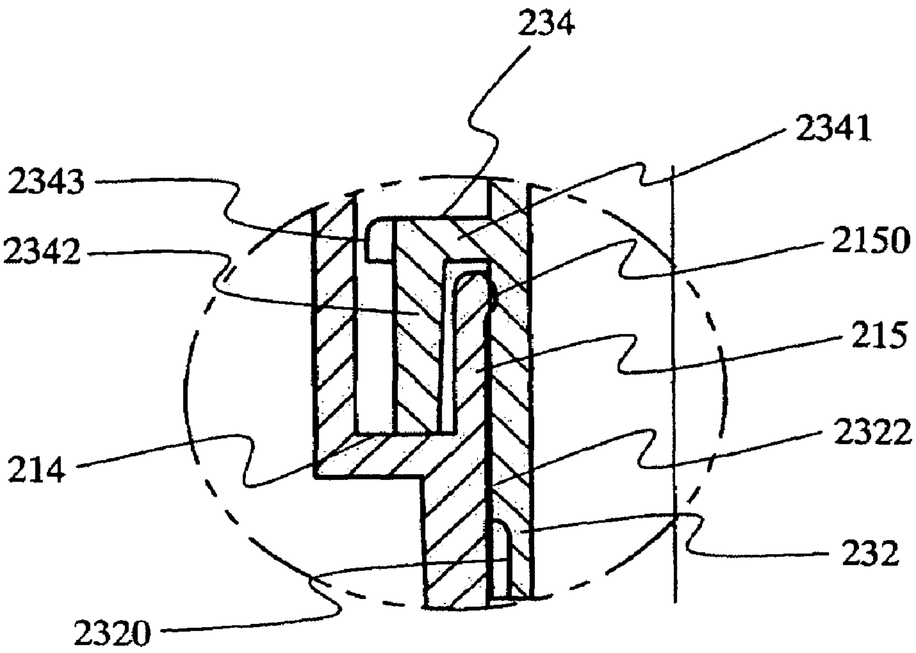
FIG. 7A is a magnified view of "Z2" region in FIG. 4.

FIG. 7A shows the region ("Z2") between a lower extension part (232) and a lateral extension part (234) of the poppet valve (230) and an inner tube (215) of the housing (210). The lateral extension part (234) consists of a horizontal part (2341) extended horizontally from the lower extension part (232) and a vertical part (2342) extended downward from the horizontal part (2341). On the vertical part (2342), a plurality of the inducing protrusions (2343) are formed which are protruded toward the housing (210). Referring to FIG. 7, the inducing protrusions (2343) are a little separated from the inner surface of the housing (210) but, in any case, the inducing protrusions (2343) are almost closed-contacted to the inner surface of housing (210).

The going-down of the poppet valve (230) stops when the vertical part (2342) of the lateral extension part (234) arrives at a lower surface (214) of the housing (210). In any case, the vertical part (2342) may be omitted, and in this case, the going-down of the poppet valve (230) stops when the upper end of the inner tube (215) of the housing (210) arrives at the lower end of the horizontal part (2341) of the lateral extension part (234). However, it is not desirable because the inner tube (215) may be easily damaged at the time of the frequent pumping or applying excess force due to its thinner thickness than that of the vertical part (2342).

Upon going-down of the poppet valve (230), the inner tube (215) of the housing (210) goes beyond the grooves (2320) of the lower extension part (232) and then slides on an outer surface (2322) of the lower extension part (232) at the closed-contact state. In case that protrusions (2150) are formed the upper portion of the inner tube (215), as described above, the protrusions (2150) go beyond the grooves (2320) of the lower extension part (232) and then slide on its outer surface (2322). The sliding movement can be carried out at the closed-contact state by the elasticity of the plastic being materials for the poppet valve (230) and/or housing (210).

Figure 7B:
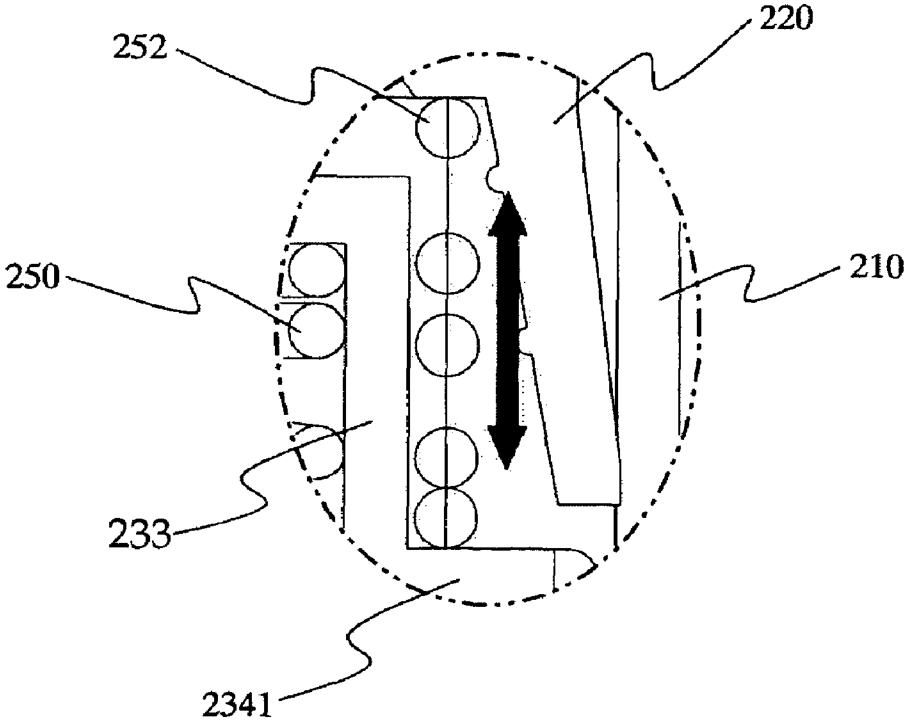
FIG. 7B is a magnified view of "Z1" region in FIG. 4.

FIG. 7B shows the region ("Z1") between upper extension part (233) of the poppet valve (230) and the piston (220) in the housing (210). The upper extension part (233) of the popped valve is above the lateral extension part (234). The first spring (250) is insight inside the lower extension part (232) of the poppet valve (230). The second spring (252) is positioned in the housing (210) outside of the poppet valve (230) on the horizontal part (2341) of the lateral extension part (234) and adjacent to the upper extension part (233) insight of the piston (220) in the housing (210). The first spring (250) and the second spring (252) are separatet by the upper extension part (233). The second spring (252) serves to enhance the upward recovering of a piston (220) when a pressure, applied to an actuator (100) for pumping, is removed.

A friction may occur between the piston (220) and the housing (210) and between the lower extension part (232) of the poppet valve (230) and the inner tube (215) of the housing (210). The friction requires a large recovering force for appropriate pumping. A first spring (250) has a relatively small diameter, compared to a spring in the configuration of a prior art pump as illustrated in FIG. 1, because the first spring (250) must be disposed inside the lower extension part (232) of the poppet valve (230). The first spring (250) of a small diameter may have difficulties to provide the recovering force sufficient for rapid response of the piston (220) in release of the pressure, hindering the appropriate operation of the pump; for example, it may become difficult to achieve a strong inflow of the liquid from a vessel to the housing (210).

The second spring (252) is a supplement for the recovering force of the first spring (250), thereby solving the above problem. Since the second spring (252) is disposed inside the housing (210) without requiring a separate space, the apparent dimension of the pump can be maintained.

Figure 8:
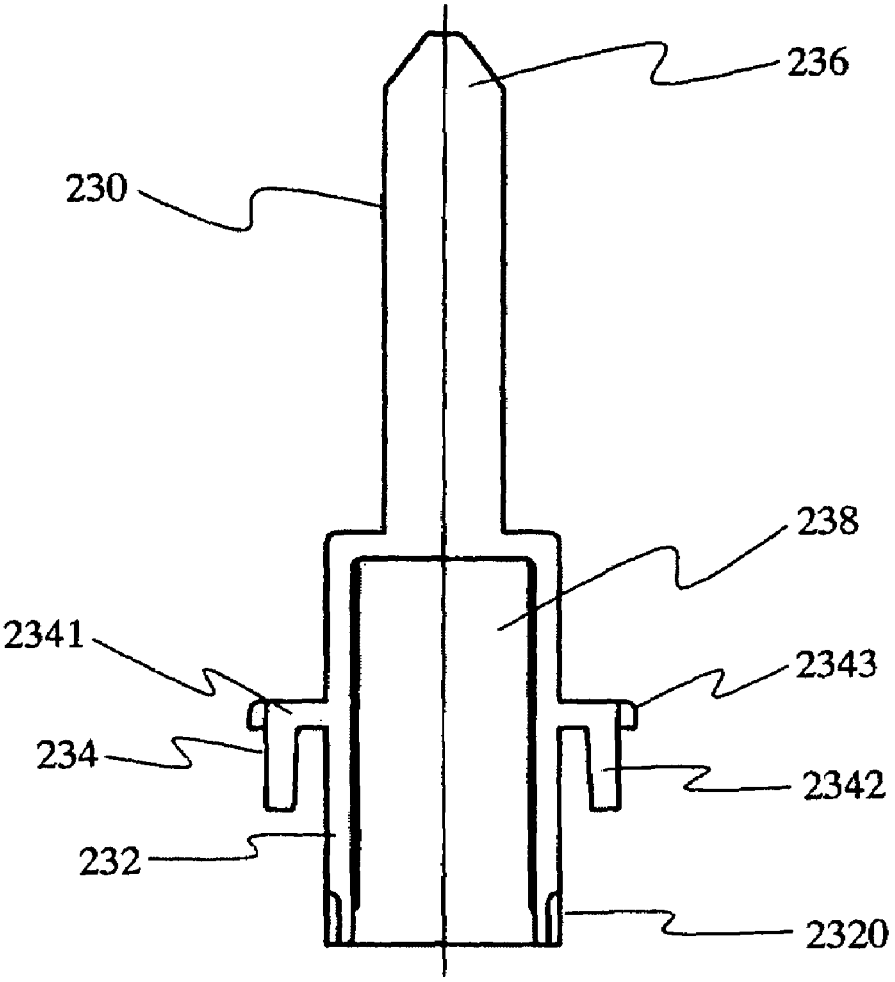
FIG. 8 is a vertical cross-sectional and bottom view of the poppet valve according to an embodiment of the present invention.
Figure 8:
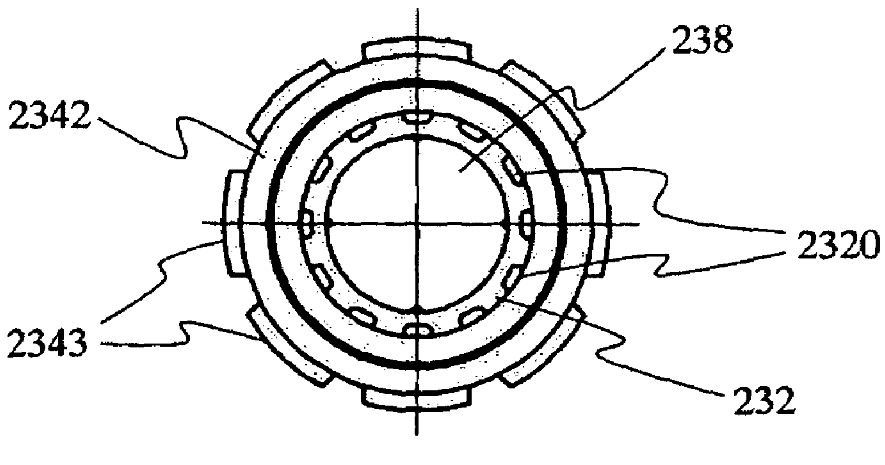

FIG. 8 shows the vertical cross-sectional view and bottom view of an exemplary poppet valve useful for the present invention. A poppet valve (230) includes a rod (236) inserted into the piston (220) at its upper portion and a space (238) for inserting the part of the spring (250) therein at its lower portion. The space (238) includes a lower extension part (232) and a lateral extension part (234), and the extension part (234) consists of a horizontal part (2341), a vertical part (2342) and inducing protrusions (2343). At the lower extension part (232), a plurality of the grooves (2320) are regularly formed along its circumference. Also at the lateral extension part (234), a plurality of inducing protrusions (2343) are radially formed along its circumference. The lengths of the grooves (2320) and vertical part (2343) can be changed depending upon the ejection amount of one-time pumping, as described early.

Figure 9:
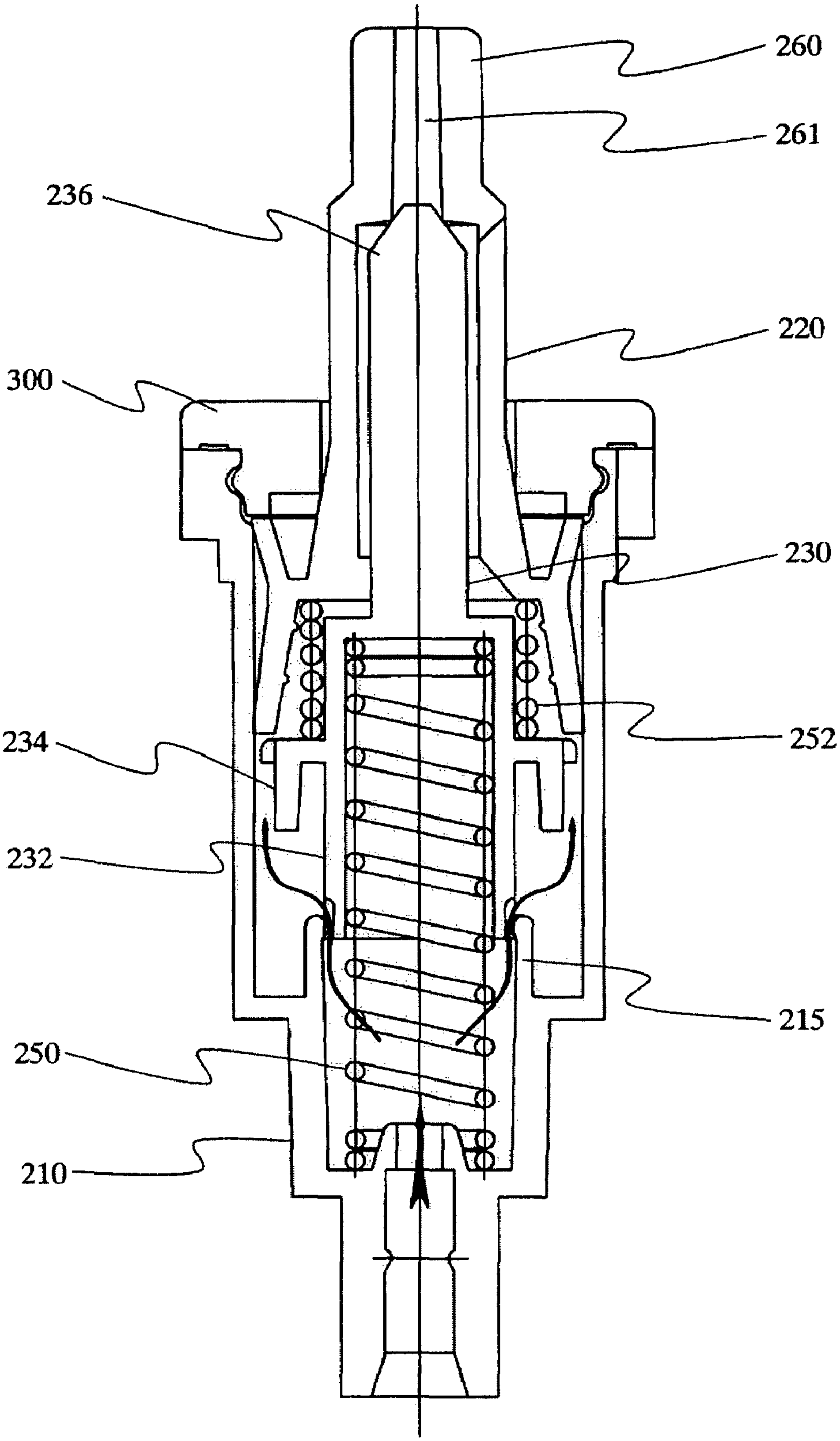
FIG. 9 is a flow view of the liquid contents at the pressure-released state in the finger-operated fixed-quantity spray pump according to the second embodiment of the present invention.
Figure 10:
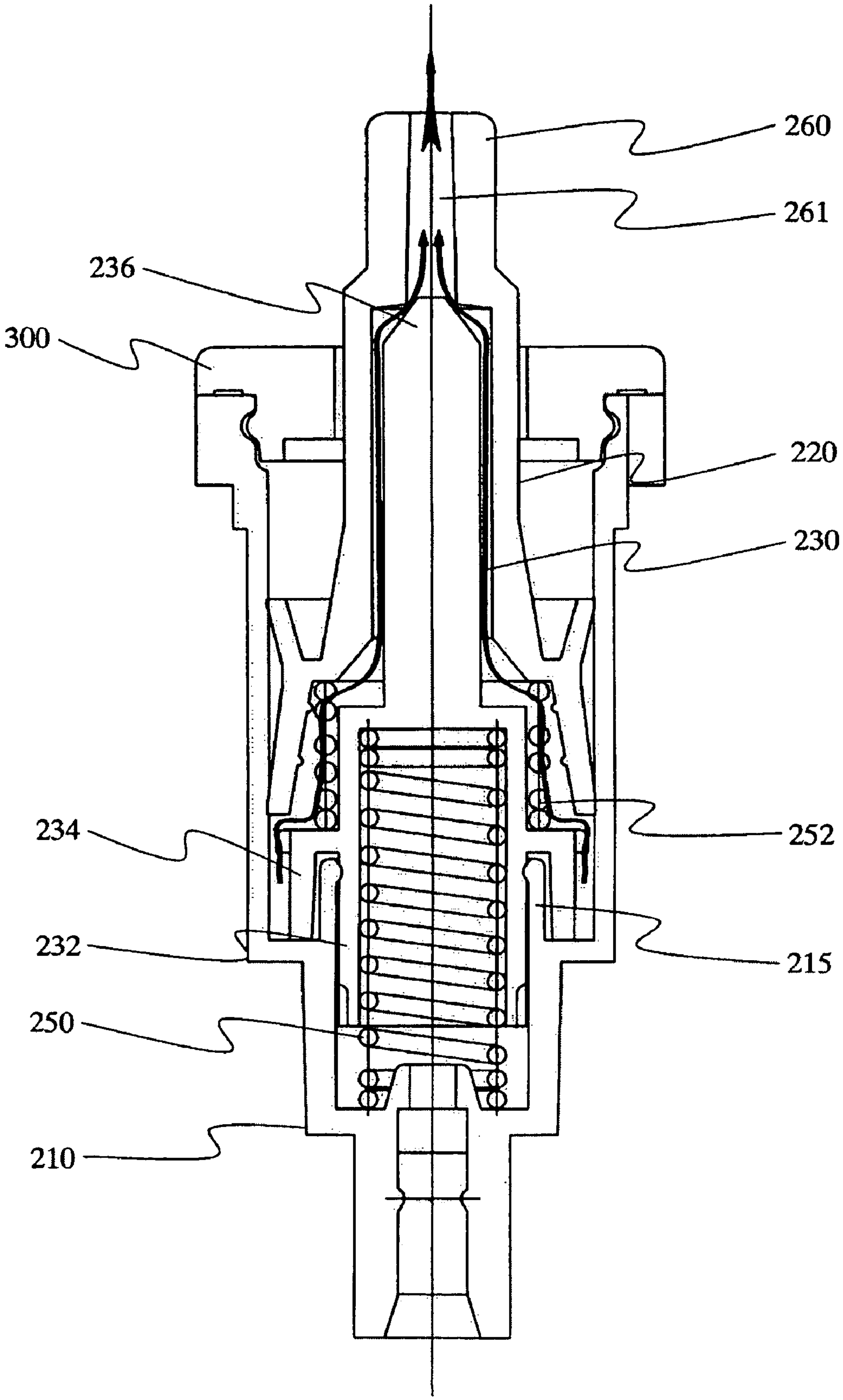
FIG. 10 is a flow view of the liquid contents at the pressurized state in the spray pump of FIG. 9.

FIG. 9 shows the flow of the liquid contents in the process that the liquid contents from the tube flow into the internal space of the pump member (200) as going-up of the piston (220) and poppet valve (230), and FIG. 10 shows the flow of the liquid contents in the process that the liquid contents being introduced in the pump member (200) go up to the actuator through the influx passage (261) upon going-down of the piston (220) and poppet valve (230).

FIG. 9A shows the flow of the liquid contents in the process that the liquid contents from the tube flow into the internal space of the pump member (200) as going-up of the piston (220) and poppet valve (230), and FIG. 10 shows the flow of the liquid contents in the process that the liquid contents being introduced in the pump member (200) go up to the actuator through the influx passage (261) upon going-down of the piston (220) and poppet valve (230).

FIG. 10 shows the flow of the liquid contents in the process that the liquid contents from the tube flow into the internal space of the pump member (200) as going-up of the piston (220) and poppet valve (230), and FIG. 10 shows the flow of the liquid contents in the process that the liquid contents being introduced in the pump member (200) go up to the actuator through the influx passage (261) upon going-down of the piston (220) and poppet valve (230).

FIG. 10A shows the flow of the liquid contents in the process that the liquid contents from the tube flow into the internal space of the pump member (200) as going-up of the piston (220) and poppet valve (230), and FIG. 10 shows the flow of the liquid contents in the process that the liquid contents being introduced in the pump member (200) go up to the actuator through the influx passage (261) upon going-down of the piston (220) and poppet valve (230).

The present invention being thus described, it will be obvious that the same may be varied in many ways. Such variations are not to be regarded as a departure from the spirit and scope of the invention and all such modifications would be obvious to one skilled in the art.

What I claim is:

1. A finger-operated fixed-quantity spray pump comprising:
- an actuator fixed on the upper portion of the pump for ejecting liquid contents;
- a pump member for sucking the liquid contents from a vessel and ejecting the liquid contents with the actuator; and
- a sealing cap for fixing the pump member to the vessel and sealing the interior of the pump member from external to the pump member; wherein the pump member comprises:
- a housing forming the external appearance of the pump member;
- a piston being engaged to a lower portion of the actuator and moving up and down along the inner surface of the housing and having an influx passage; and
- a poppet valve moving up and down and having a rod for opening and closing the influx passage of the piston at its upper portion, the poppet valve being connected to a first spring at its lower portion, and the first spring being mounted in the lower inner portion of the housing, and the poppet valve being connected to a second spring at its upper portion, and the second spring being mounted in the upper portion of the housing between the poppet valve and the piston, the poppet valve having a lateral extension part, a lower extension part provided for being inserted in an inner tube of the housing lower portion upon moving the poppet valve down, grooves being formed on the lower extension part; and the housing having a nozzle being located inside the first spring and extending upward from an inlet.

2. The finger-operated fixed-quantity spray pump according to claim 1 wherein the shape of said housing inner tube is a simple cylindrical structure or a complex cylindrical structure with protrusions corresponding to the grooves of the poppet valve formed at the upper inner portion of the inner tube.

3. The finger-operated fixed-quantity spray pump according to claim 1 wherein the ejection amount of one-time pumping can be controlled by adjusting the length of said housing and the length of said lateral extension part without changing the structures of other constitutional units.

4. The finger-operated fixed-quantity spray pump according to claim 1 wherein said lateral extension part comprises a horizontal part extending horizontally from the lower extension part and a vertical part extending downwardly from the horizontal part.

5. The finger-operated fixed-quantity spray pump according to claim 1 wherein the second spring has a larger diameter that the first spring.

6. The finger-operated fixed-quantity spray pump according to claim 4 wherein the lateral extension part comprises inducing protrusions formed toward said housing.

7. The finger-operated fixed-quantity spray pump according to claim 1 wherein the second spring is mounted on the horizontal part of the lateral extension of the poppet valve.

8. The finger-operated fixed-quantity spray pump according to claim 1 wherein the second spring is disposed inside the housing without requiring a separate space.

9. The finger-operated fixed-quantity spray pump according to claim 1 wherein the second spring is a supplement for recovering force of the first spring.

10. A pump member for a finger-operated fixed-quantity spray pump, for sucking a liquid from an inlet and ejecting the liquid through an outlet, the pump member comprising:
- a housing forming an outer part of the pump member, the housing having a vertical axis;
- a piston having an upper part for being coupled to an actuator, the piston disposed to move axially along an inner surface of the housing, the piston having an influx passage, an upper end of the influx passage being in fluid communication with the outlet of the pump member;
- a poppet valve provided for moving axially in the piston and comprising:
  - a rod having an upper portion for closing the influx passage of the piston when the poppet valve is in an upward position in the piston and opening the influx passage when the poppet valve is not in the upward position in the piston; and
  - a lower portion having a downwardly extending lower extension part, coupled to an inner tube extending upwardly from a lower portion of the housing around an inlet of the housing, the lower extension part having a peripheral wall sliding axially along a peripheral wall of the inner tube, the peripheral wall of one of the lower extension part and the inner tube formed with a recess, to provide a fluid path between the inside and the outside of the inner tube when the poppet valve is in a preselected vicinity of a downward position in the housing and substantially no fluid path between the inside and the outside of the inner tube when the poppet valve is not in the preselected vicinity of the downward position in the housing;
- a first spring disposed for pushing the poppet valve upwardly from the lower portion of the housing; and
- a second spring disposed for pushing the poppet valve downwardly from the piston.

11. A pump member according to claim 10, wherein the poppet valve comprises a downwardly extending stopping part for preventing the poppet valve from moving down to a position where the poppet valve presses downwardly on the inner tube of the housing.

12. A pump member according to claim 11, wherein the downwardly extending lower extension part is disposed to slide axially inside the inner tube of the housing, and wherein the stopping part comprises a horizontal part extending horizontally from the lower extension part and a vertical part extending downwardly from the horizontal part.

* * * * *